UNITED STATES PATENT OFFICE.

HEINRICH HEIDENHAIN, OF CHICAGO, ILLINOIS, ASSIGNOR TO WILLIAM ZINSSER & CO., OF NEW YORK, N. Y.

MANUFACTURE OF DISINFECTANTS.

SPECIFICATION forming part of Letters Patent No. 479,710, dated July 26, 1892.

Application filed October 24, 1891. Serial No. 409,714. (No specimens.)

*To all whom it may concern:*

Be it known that I, HEINRICH HEIDENHAIN, a subject of the King of Prussia, residing at Chicago, in the county of Cook and State of Illinois, have invented new and useful Improvements in the Manufacture of Disinfectants and Antiseptics, of which the following is a specification.

This invention relates to a new disinfectant or antiseptic prepared from beta-naphthol and to the process for preparing said disinfectant or antiseptic. It is a well-known fact that beta-naphthol dissolves sparingly in boiling water and that when beta-naphthol is reduced to a fine powder and brought in contact with water such powder floats upon the water and its solution can be effected only by long-continued agitation. I have discovered that by melting beta-naphthol with certain water-soluble bodies a product is obtained which readily dissolves in water and produces a clear solution. The water-soluble bodies which can be used in preparing the new product are acetate of soda and neutral alkaline tartrates, like tartrate of potash and soda; also, many solid alcohols, such as cane-sugar, glucose, and mannite; also, citric acid and partially-dehydrated boric acid, as well as mixtures of the above compounds, except such mixtures which when melted with beta-naphthol produce a chemical change of the latter.

The following may be given as an example in which my invention can be carried out in practice: I melt in a suitable vessel one hundred pounds of crystallized acetate of soda. Then I add to this melt, while continuing to heat, thirty pounds of beta-naphthol in powder. The mass is continually stirred, and while it is at first turbid it afterwards becomes perfectly clear when the beta-naphthol is dissolved. The mass is then dipped out and poured in thin layers upon cold metal trays and left to harden, which in this case takes place almost immediately, while when other water-soluble bodies are used—such, for instance, as partially-dehydrated boric acid or citric acid—the hardening requires a longer time. For practical use the hardened mass is reduced to a fine powder, which is packed ready for the market.

In my new product the beta-naphthol is distributed in a very fine state throughout the body of the water-soluble substance used in its preparation, and for this reason it can be readily dissolved in a sufficient quantity of water.

My new product is a white or almost white powder readily soluble in a large quantity of water, also soluble in alcohol; but it becomes decomposed by benzine.

What I claim as new, and desire to secure by Letters Patent, is—

1. The product herein described, which is composed of beta-naphthol and acetate of soda and which forms a white or almost white powder readily soluble in a large quantity of water, also soluble in alcohol, and which becomes decomposed by benzine.

2. The within-described process of producing the new product above named, which process consists in melting acetate of soda, then adding to the melt about one-third of its weight of beta-naphthol, and finally allowing the mass to harden, substantially as described.

In testimony whereof I have hereunto set my hand in the presence of two subscribing witnesses.

HEINRICH HEIDENHAIN.

Witnesses:
J. MILTON DIMMICK,
BENJM. BIRCH.